United States Patent
Gogoi et al.

(10) Patent No.: US 8,352,984 B2
(45) Date of Patent: Jan. 8, 2013

(54) SYSTEM AND METHOD FOR GENERATING AND MANAGING USER PREFERENCE INFORMATION FOR SCHEDULED AND STORED TELEVISION PROGRAMS

(75) Inventors: Amar Gogoi, Fremont, CA (US); Labeeb Ismail, San Francisco, CA (US); Santosh Godbole, Sunnyvale, CA (US); Richard Humpleman, Fremont, CA (US)

(73) Assignee: Thomson Licensing, Boulogne-Billancourt (FR)

(*) Notice: Subject to any disclaimer, the term of this patent is extended or adjusted under 35 U.S.C. 154(b) by 1585 days.

(21) Appl. No.: 10/156,153

(22) Filed: May 28, 2002

(65) Prior Publication Data
US 2002/0199193 A1  Dec. 26, 2002

Related U.S. Application Data

(63) Continuation-in-part of application No. 09/096,592, filed on Jun. 12, 1998, now Pat. No. 6,614,987.

(51) Int. Cl.
H04N 5/445 (2011.01)
G06F 3/00 (2006.01)
G06F 13/00 (2006.01)
H04N 7/16 (2011.01)
H04N 5/76 (2006.01)
G06Q 30/00 (2006.01)

(52) U.S. Cl. ............ 725/46; 725/14; 386/296; 386/297; 705/14.53; 705/14.66; 705/14.67

(58) Field of Classification Search .............. 725/46, 725/14; 348/180; 386/296, 297; 705/14.53, 705/14.66, 14.67
See application file for complete search history.

(56) References Cited

U.S. PATENT DOCUMENTS

| 5,128,752 | A |   | 7/1992  | Von Kohorn |
| 5,223,924 | A |   | 6/1993  | Strubbe |
| 5,262,875 | A |   | 11/1993 | Mincer et al. |
| 5,287,181 | A |   | 2/1994  | Holman |
| 5,324,338 | A |   | 6/1994  | Holmstrom |
| 5,355,161 | A |   | 10/1994 | Bird et al. |
| 5,371,551 | A |   | 12/1994 | Logan et al. |
| 5,410,344 | A |   | 4/1995  | Graves et al. |
| 5,416,508 | A | * | 5/1995  | Sakuma et al. .......... 725/54 |

(Continued)

FOREIGN PATENT DOCUMENTS
EP     0705036     4/1996
(Continued)

OTHER PUBLICATIONS

Ravikant, N. et al., API Requirements for the Advanced Set-Top Box, Sep. 2, 1997, 14 pages.

(Continued)

*Primary Examiner* — Hoang-Vu A Nguyen-Ba
(74) *Attorney, Agent, or Firm* — Robert D. Shedd; Vincent E. Duffy; Joel M. Fogelson

(57) ABSTRACT

Television program availability and recordings are personalized by learning the program preferences of the TV and PDR user. This is effected over a period of time by observing, recording and processing user activity. A viewing record module agent (VRM) and a program information viewing history agent (CDM) are software agents that, according to built-in algorithms, operate on user activity and other events to ultimately produce preference profile information in special purpose relational databases (CDB, viewing history database).

27 Claims, 11 Drawing Sheets

U.S. PATENT DOCUMENTS

| | | | |
|---|---|---|---|
| 5,446,919 A | 8/1995 | Wilkins | |
| 5,463,565 A | 10/1995 | Cookson et al. | 364/514 |
| 5,483,278 A | 1/1996 | Strubbe et al. | |
| 5,523,794 A | 6/1996 | Mankovitz et al. | |
| 5,537,157 A | 7/1996 | Washio et al. | |
| 5,559,549 A | 9/1996 | Hendricks | |
| 5,565,909 A | 10/1996 | Thibadeau | |
| 5,579,055 A | 11/1996 | Hamilton et al. | |
| 5,585,865 A * | 12/1996 | Amano et al. | 725/14 |
| 5,600,364 A | 2/1997 | Hendricks et al. | |
| 5,635,989 A | 6/1997 | Rothmuller | |
| 5,636,346 A | 6/1997 | Saxe | |
| 5,652,613 A | 7/1997 | Lazarus et al. | |
| 5,664,046 A | 9/1997 | Abecassis | |
| 5,671,411 A | 9/1997 | Watts et al. | |
| 5,699,473 A | 12/1997 | Kim | |
| 5,701,383 A | 12/1997 | Russo et al. | |
| 5,704,017 A | 12/1997 | Heckerman et al. | |
| 5,717,923 A | 2/1998 | Dedrick | |
| 5,724,091 A | 3/1998 | Freeman et al. | |
| 5,724,521 A | 3/1998 | Dedrick | |
| 5,754,651 A | 5/1998 | Blatter et al. | |
| 5,758,257 A | 5/1998 | Herz et al. | |
| 5,758,259 A | 5/1998 | Lawler | |
| 5,761,371 A | 6/1998 | Ohno et al. | |
| 5,768,785 A | 6/1998 | Pessin | |
| 5,774,170 A | 6/1998 | Hite | |
| 5,778,135 A | 7/1998 | Ottesen et al. | |
| 5,781,228 A | 7/1998 | Sposato | |
| 5,790,935 A | 8/1998 | Payton | |
| 5,794,210 A | 8/1998 | Goldhaber et al. | |
| 5,798,785 A | 8/1998 | Hendricks et al. | |
| 5,801,747 A * | 9/1998 | Bedard | 725/46 |
| 5,806,045 A | 9/1998 | Biorge et al. | |
| 5,809,471 A | 9/1998 | Brodsky | |
| 5,818,441 A | 10/1998 | Throckmorton et al. | |
| 5,835,087 A | 11/1998 | Herz et al. | |
| 5,848,396 A | 12/1998 | Gerace | |
| 5,867,226 A | 2/1999 | Wehmeyer et al. | |
| 5,878,141 A | 3/1999 | Daly et al. | |
| 5,898,456 A | 4/1999 | Wahl | |
| 5,907,350 A | 5/1999 | Nemirofsky | |
| 5,945,988 A | 8/1999 | Williams et al. | |
| 5,953,073 A | 9/1999 | Kozina et al. | |
| 5,977,964 A * | 11/1999 | Williams et al. | 715/721 |
| 5,990,927 A | 11/1999 | Hendricks et al. | |
| 6,002,393 A | 12/1999 | Hite | |
| 6,005,561 A | 12/1999 | Hawkins et al. | |
| 6,005,597 A | 12/1999 | Barrett et al. | |
| 6,018,612 A | 1/2000 | Thomason et al. | |
| 6,020,883 A | 2/2000 | Herz et al. | |
| 6,029,045 A | 2/2000 | Picco et al. | |
| 6,029,195 A | 2/2000 | Herz | |
| 6,038,612 A | 3/2000 | Liow | |
| 6,057,872 A | 5/2000 | Candelore | |
| 6,075,971 A | 6/2000 | Williams | |
| 6,088,722 A | 7/2000 | Herz et al. | |
| 6,091,883 A | 7/2000 | Artigalas et al. | |
| 6,101,529 A | 8/2000 | Chrabaszcz | |
| 6,105,862 A | 8/2000 | Pailles et al. | |
| 6,128,009 A * | 10/2000 | Ohkura et al. | 725/46 |
| 6,134,532 A | 10/2000 | Lazarus et al. | |
| 6,141,010 A | 10/2000 | Hoyle | |
| 6,157,411 A | 12/2000 | Williams et al. | |
| 6,157,772 A | 12/2000 | Kim | |
| 6,160,570 A | 12/2000 | Sitnik | |
| 6,169,842 B1 | 1/2001 | Pijnenburg et al. | |
| 6,177,931 B1 | 1/2001 | Alexander et al. | |
| 6,185,360 B1 | 2/2001 | Inoue et al. | |
| 6,209,131 B1 | 3/2001 | Kim et al. | |
| 6,233,389 B1 | 5/2001 | Barton et al. | |
| 6,236,395 B1 | 5/2001 | Sezan et al. | |
| 6,237,145 B1 | 5/2001 | Narasimhan et al. | |
| 6,260,194 B1 | 7/2001 | Shiels et al. | |
| 6,304,714 B1 | 10/2001 | Krause et al. | |
| 6,317,881 B1 | 11/2001 | Shah-Nazaroff et al. | |
| 6,324,334 B1 | 11/2001 | Morioka et al. | |
| 6,324,338 B1 | 11/2001 | Wood | |
| 6,396,500 B1 | 5/2002 | Qureshi et al. | |
| 6,401,242 B1 | 6/2002 | Eyer et al. | |
| 6,446,261 B1 | 9/2002 | Rosser | |
| 6,450,407 B1 | 9/2002 | Freeman et al. | |
| 6,457,010 B1 | 9/2002 | Eldering et al. | |
| 6,463,585 B1 | 10/2002 | Hendricks et al. | |
| 6,466,241 B1 * | 10/2002 | Schindler | 715/854 |
| 6,480,667 B1 | 11/2002 | O'Connor | |
| 6,505,773 B1 | 1/2003 | Palmer et al. | |
| 6,507,950 B1 | 1/2003 | Tsukidate et al. | |
| 6,530,082 B1 * | 3/2003 | Del Sesto et al. | 725/9 |
| 6,536,041 B1 | 3/2003 | Knudson et al. | |
| 6,553,178 B2 | 4/2003 | Abecassis | |
| 6,583,825 B1 | 6/2003 | Yuen et al. | |
| 6,587,561 B1 * | 7/2003 | Sered et al. | 380/241 |
| 6,599,473 B1 | 7/2003 | Egger et al. | |
| 6,601,237 B1 | 7/2003 | Ten Kate et al. | |
| 6,607,136 B1 | 8/2003 | Atsmon et al. | |
| 6,614,987 B1 | 9/2003 | Ismail et al. | |
| 6,637,029 B1 | 10/2003 | Maissel et al. | |
| 6,675,384 B1 | 1/2004 | Block et al. | |
| 6,681,396 B1 | 1/2004 | Bates et al. | |
| 6,684,240 B1 | 1/2004 | Goddard | |
| 6,698,020 B1 | 2/2004 | Zigmond et al. | |
| 6,704,930 B1 | 3/2004 | Eldering et al. | |
| 6,704,931 B1 | 3/2004 | Schaffer et al. | |
| 6,738,978 B1 | 5/2004 | Hendricks et al. | |
| 6,799,326 B2 | 9/2004 | Boylan, III et al. | |
| 6,852,031 B1 | 2/2005 | Rowe | |
| 6,898,762 B2 | 5/2005 | Ellis et al. | |
| 6,915,271 B1 | 7/2005 | Meyer et al. | |
| 6,918,131 B1 | 7/2005 | Rautila et al. | |
| 6,928,653 B1 | 8/2005 | Ellis et al. | |
| 6,950,623 B2 | 9/2005 | Brown et al. | |
| 6,981,040 B1 | 12/2005 | Konig et al. | |
| 6,990,677 B1 | 1/2006 | Pietraszak et al. | |
| 6,993,782 B1 | 1/2006 | Newberry et al. | |
| 7,003,792 B1 | 2/2006 | Yuen | |
| 7,013,286 B1 | 3/2006 | Aggarwal et al. | |
| 7,013,478 B1 | 3/2006 | Hendricks et al. | |
| 7,035,528 B1 | 4/2006 | Britton | |
| 7,039,928 B2 * | 5/2006 | Kamada et al. | 725/9 |
| 7,051,351 B2 | 5/2006 | Goldman et al. | |
| 7,051,352 B1 | 5/2006 | Schaffer | |
| 7,054,900 B1 | 5/2006 | Goldston | |
| 7,086,076 B1 | 8/2006 | Park | |
| 7,096,486 B1 * | 8/2006 | Ukai et al. | 725/58 |
| 7,103,575 B1 | 9/2006 | Linehan | |
| 7,144,627 B2 | 12/2006 | Halas et al. | |
| 7,146,626 B1 | 12/2006 | Arsenault et al. | |
| 7,152,236 B1 | 12/2006 | Wugofski et al. | |
| 7,194,753 B1 | 3/2007 | Fries et al. | |
| 7,370,342 B2 | 5/2008 | Ismail et al. | |
| 7,594,247 B2 | 9/2009 | Arai et al. | |
| 2001/0004733 A1 | 6/2001 | Eldering | |
| 2001/0014870 A1 | 8/2001 | Saito et al. | |
| 2001/0049826 A1 | 12/2001 | Wilf | |
| 2002/0023263 A1 | 2/2002 | Ahn et al. | |
| 2002/0057893 A1 | 5/2002 | Wood et al. | |
| 2002/0073426 A1 | 6/2002 | Bhatt | |
| 2002/0111918 A1 | 8/2002 | Hoshino et al. | |
| 2002/0118954 A1 | 8/2002 | Barton et al. | |
| 2002/0120627 A1 | 8/2002 | Mankoff | |
| 2002/0131768 A1 | 9/2002 | Gammenthaler | |
| 2002/0186296 A1 | 12/2002 | Gogoi et al. | |
| 2002/0199193 A1 | 12/2002 | Gogoi et al. | |
| 2002/0199194 A1 | 12/2002 | Ali | |
| 2003/0005432 A1 * | 1/2003 | Ellis et al. | 725/13 |
| 2003/0023973 A1 | 1/2003 | Monson et al. | |
| 2003/0028518 A1 | 2/2003 | Mankoff | |
| 2003/0040962 A1 | 2/2003 | Lewis | |
| 2003/0056216 A1 | 3/2003 | Wugofski et al. | |
| 2003/0067554 A1 | 4/2003 | Klarfeld et al. | |
| 2003/0088872 A1 | 5/2003 | Maissel et al. | |
| 2003/0093792 A1 | 5/2003 | Labeeb et al. | |
| 2003/0101451 A1 * | 5/2003 | Bentolila et al. | 725/34 |
| 2003/0101457 A1 | 5/2003 | Tiemann | |
| 2003/0118323 A1 | 6/2003 | Ismail et al. | |
| 2003/0145323 A1 | 7/2003 | Hendricks et al. | |

| | | | |
|---|---|---|---|
| 2003/0158818 | A1 | 8/2003 | George et al. |
| 2004/0111742 | A1 | 6/2004 | Hendricks et al. |
| 2004/0117831 | A1 | 6/2004 | Ellis et al. |
| 2004/0128241 | A1 | 7/2004 | Akama |
| 2005/0047752 | A1 | 3/2005 | Wood et al. |
| 2005/0144066 | A1 | 6/2005 | Cope et al. |
| 2005/0144641 | A1 | 6/2005 | Lewis |
| 2005/0193410 | A1 | 9/2005 | Eldering |
| 2005/0235318 | A1 | 10/2005 | Grauch et al. |
| 2006/0206912 | A1 | 9/2006 | Klarfeld et al. |
| 2006/0212904 | A1 | 9/2006 | Klarfeld et al. |
| 2007/0203794 | A1 | 8/2007 | Hajdukiewicz et al. |
| 2008/0040749 | A1 | 2/2008 | Hoffberg et al. |
| 2008/0120186 | A1 | 5/2008 | Jokinen et al. |
| 2008/0134234 | A1 | 6/2008 | Deiss et al. |
| 2008/0134243 | A1 | 6/2008 | Klosterman |

FOREIGN PATENT DOCUMENTS

| | | |
|---|---|---|
| EP | 0 774 866 A2 | 5/1997 |
| EP | 0823815 | 2/1998 |
| EP | 0838951 | 4/1998 |
| EP | 0 854 645 A2 | 7/1998 |
| EP | 0851681 | 7/1998 |
| EP | 0909095 | 4/1999 |
| EP | 9802935 | 3/2000 |
| EP | 1 045 582 A1 | 10/2000 |
| EP | 1 331 814 A2 | 7/2003 |
| JP | 09128276 A | 5/1997 |
| WO | 9222983 | 12/1992 |
| WO | WO 92/22983 A2 | 12/1992 |
| WO | 9413107 | 6/1994 |
| WO | WO94/13107 | 6/1994 |
| WO | 9421081 | 9/1994 |
| WO | 9501057 | 1/1995 |
| WO | WO95/01057 | 1/1995 |
| WO | 9609721 | 3/1996 |
| WO | 9631980 | 10/1996 |
| WO | WO96/31980 | 10/1996 |
| WO | 9741673 A2 | 11/1997 |
| WO | 9748230 | 12/1997 |
| WO | 9750251 | 12/1997 |
| WO | WO97/48230 | 12/1997 |
| WO | 9828906 | 7/1998 |
| WO | WO98/28906 | 7/1998 |
| WO | 9901984 A1 | 1/1999 |
| WO | 9955066 | 10/1999 |
| WO | 0002380 A2 | 1/2000 |
| WO | 0004708 A1 | 1/2000 |
| WO | 0011869 A1 | 3/2000 |
| WO | 0033160 A2 | 6/2000 |
| WO | 0117250 A1 | 3/2001 |

OTHER PUBLICATIONS

IBM, The challenges of convergence for Set-Top Box manufacturers, Nov. 19, 1997, 14 pages.
IBM, Set-Top Box Solutions: Helping Customers Meet the Challenges of Convergence, Mar. 1997, 2 pages.
IBM, Set-Top Box Peripheral Chip, Mar. 1997, 3 pages.
IBM, Set-Top Reference Design Kit, Mar. 1997, 3 pages.
IBM, Set-Top Box solutions, Mar. 1997, 5 pages.
OpenTv, Inc., OpenTV Operating Environment, Feb. 1998, 9 pages.
OpenTV, Inc., Application Development for OpenTV, Feb. 1998, 11 pages.
Metabyte Networks, Inc., Metabyte Personalizes Microsoft TV, Jun. 14, 1999, 1 page.
Oracle Corporation, Oracle Lite: The Client Database for Java, Jun. 5, 1998, 2 pages.
OpenCable, Reference Material, Oct. 21, 1997, 1 page.
StarSight Telecast, Inc., StarSight: The Interactive On-screen TV Program Guide Service with One-button VCR Programming, Jun. 9, 1998, 3 pages.
StarSight Telecast, Inc., StarSight: An Introduction, Jun. 9, 1998, 1 page.
TVData, Services for On-Screen Guides, Jun. 9, 1998, 1 page.
TVData, The Largest Databases of Television Information in the World, Jun. 6, 1998, 1 page.
Kageyama et al., "A Free Time-Shift DVD Video Recorder"; Aug. 1997, IEEE pp. 463-473.
U.S. Office Action for U.S. Appl. No. 09/652,478 mailed on Aug. 11, 2004.
U.S. Office Action for U.S. Appl. No. 09/652,478 mailed on Jun. 29, 2005.
U.S. Office Action for U.S. Appl. No. 09/652,478 mailed on Oct. 26, 2005.
Notice of Allowance for U.S. Appl. No. 09/652,478 mailed on Feb. 21, 2006.
Supplemental Notice of Allowance for U.S. Appl. No. 09/652,478 mailed on Apr. 5, 2006 (signed Apr. 3, 2006).
Supplemental Notice of Allowance for U.S. Appl. No. 09/652,478 mailed on Apr. 5, 2006 (signed Apr. 10, 2006).
Notice of Allowance for U.S. Appl. No. 09/652,478 mailed on Aug. 8, 2006.
Notice of Allowance for U.S. Appl. No. 11/438,928 mailed on Dec. 28, 2007.
U.S. Office Action for U.S. Appl. No. 10/999,379 mailed on Feb. 15, 2007.
U.S. Office Action for U.S. Appl. No. 10/999,379 mailed on Aug. 10, 2007.
U.S. Office Action for U.S. Appl. No. 10/999,379 mailed on Mar. 21, 2008.
U.S. Office Action for U.S. Appl. No. 10/999,379 mailed on Jun. 26, 2008.
U.S. Office Action for U.S. Appl. No. 10/999,379 mailed on Oct. 7, 2008.
U.S. Office Action for U.S. Appl. No. 10/999,379 mailed on Apr. 28, 2009.
Office Action issued in Japanese Patent Application No. 002179/2002, Jan. 15, 2008 (English Translation enclosed).
Lawrence R. Rabiner, "A Tutorial on Hidden Markov Models and Selected Applications in Speech Recognition", Proceedings of the IEEE, vol. 77, No. 2, pp. 257-286, Feb. 1989.
U.S. Office Action for U.S. Appl. No. 09/893,192 mailed Jun. 15, 2005.
U.S. Final Office Action for U.S. Appl. No. 09/893,192 mailed Aug. 2, 2007.
U.S. Office Action for U.S. Appl. No. 09/893,192 mailed Mar. 7, 2008.
U.S. Final Office Action for U.S. Appl. No. 09/893,192 mailed Mar. 17, 2009.
U.S. Office Action for U.S. Appl. No. 091893,192 mailed Oct. 6, 2009.
U.S. Office Action for U.S. Appl. No. 09/953,327 mailed Sep. 14, 2005.
U.S. Final Office Action for U.S. Appl. No. 09/953,327 mailed Mar. 15, 2006.
U.S. Advisory Action for U.S. Appl. No. 09/953,327 mailed Jun. 5, 2006.
U.S. Office Action for U.S. Appl. No. 09/953,327 mailed Aug. 16, 2006.
U.S. Final Office Action for U.S. Appl. No. 09/953,327 mailed Mar. 21, 2007.
U.S. Office Action for U.S. Appl. No. 09/953,327 mailed Sep. 11, 2007.
U.S. Restriction Requirement for U.S. Appl. No. 09/963,335 mailed Nov. 14, 2005.
U.S. Office Action for U.S. Appl. No. 09/963,335 mailed Jan. 25, 2006.
U.S. Final Office Action for U.S. Appl. No. 09/963,335 mailed Aug. 10, 2006.
U.S. Advisory Action for U.S. Appl. No. 09/963,335 mailed Dec. 18, 2006.
U.S. Office Action for U.S. Appl. No. 09/963,335 mailed Apr. 5, 2007.
U.S. Office Action for U.S. Appl. No. 09/963,335 mailed Oct. 9, 2007.
U.S. Final Office Action for U.S. Appl. No. 09/963,335 mailed Feb. 22, 2008.
U.S. Advisory Action for U.S. Appl. No. 09/963,335 mailed May 15, 2008.

U.S. Office Action for U.S. Appl. No. 09/963,335 mailed Aug. 7, 2008.
U.S. Final Office Action for U.S. Appl. No. 09/963,335 mailed Jan. 22, 2009.
U.S. Office Action for U.S. Appl. No. 09/963,335 mailed Jul. 7, 20009.
U.S. Office Action for U.S. Appl. No. 10/043,714 mailed Jul. 6, 2006.
U.S. Final Office Action for U.S. Appl. No. 10/043,714 mailed Jan. 26, 2007.
U.S. Advisory Action for U.S. Appl. No. 10/043,714 mailed Jun. 14, 2007.
U.S. Office Action for U.S. Appl. No. 10/043,714 mailed Sep. 20, 2007.
U.S. Final Office Action for U.S. Appl. No. 10/043,714 mailed Mar. 24, 2008.
U.S. Advisory Action for U.S. Appl. No. 10/043,714 mailed Jul. 11, 2008.
U.S. Office Action for U.S. Appl. No. 10/043,714 mailed Oct. 8, 2008.
U.S. Final Office Action for U.S. Appl. No. 10/043,714 mailed May 26, 2009.
U.S. Office Action for U.S. Appl. No. 11/370,081 mailed Oct. 5, 2007.
U.S. Office Action for U.S. Appl. No. 11/370,081 mailed Apr. 8, 2008.
U.S. Final Office Action for U.S. Appl. No. 11/370,081 mailed Oct. 16, 2008.
U.S. Office Action for U.S. Appl. No. 11/370,156 mailed Oct. 9, 2007.
U.S. Final Office Action for U.S. Appl. No. 11/370,156 mailed Feb. 22, 2008.
U.S. Advisory Action for U.S. Appl. No. 11/370,156 mailed May 15, 2008.
U.S. Office Action for U.S. Appl. No. 11/370,156 mailed Aug. 7, 2008.
U.S. Restriction Requirement for U.S. Appl. No. 11/370,156 mailed Jan. 28, 2009.
Claria.com "Claria Corporate Overview" Apr. 20, 2004.
"Distributed Digital-Ticket Management for Rights Trading System", Proceedings of the 1st ACM Conference on Electronic Commerce EC'99, 1999.

\* cited by examiner

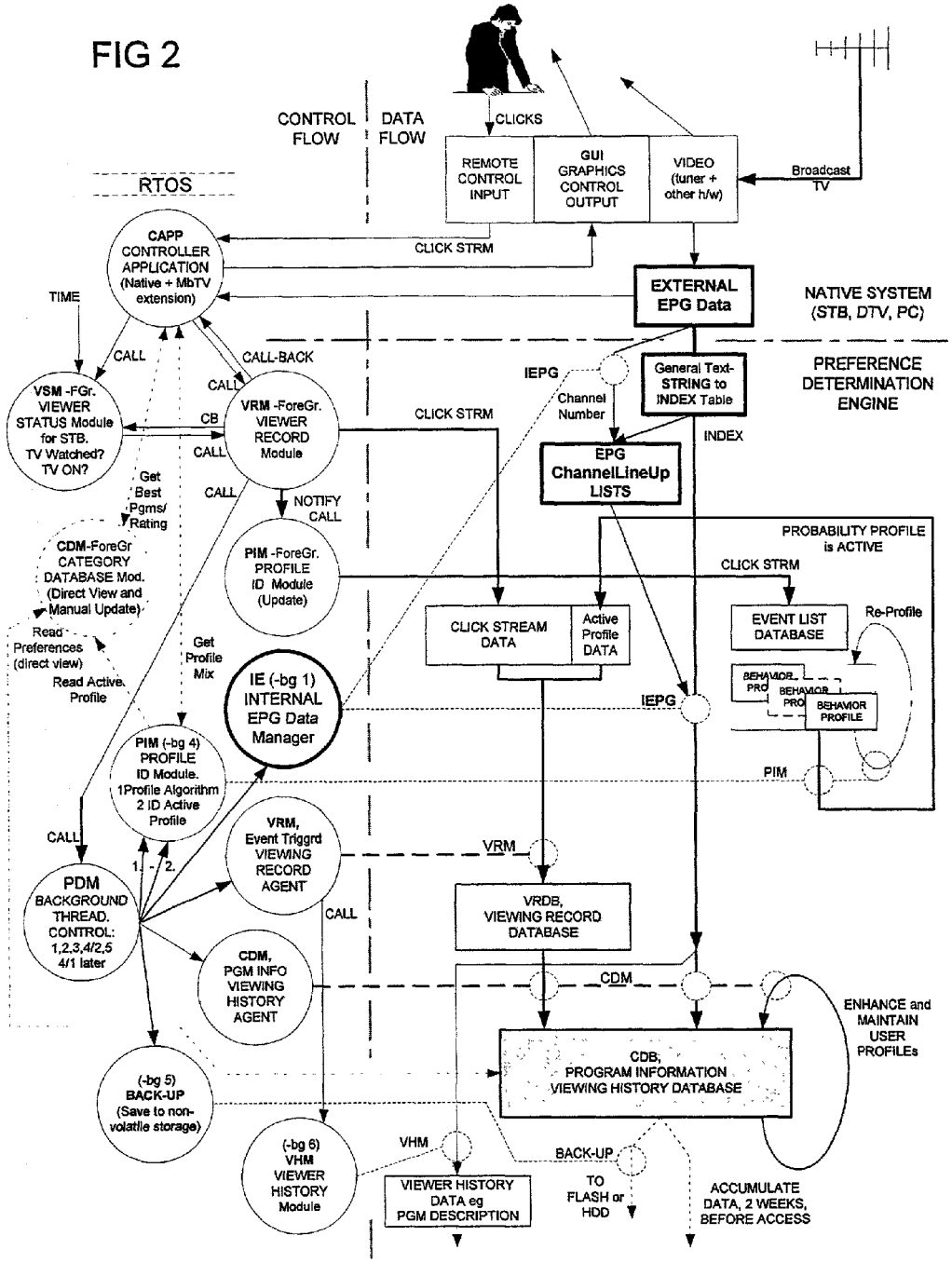

| User Event Type | Viewer Record Number (index) | Channel ID | User Event Time Stamp | Actual Program (EPG) Time | Viewing Duration | Channel Type | Probability User (1) Active | Probability User (n) Active |
|---|---|---|---|---|---|---|---|---|
| Play | 0 | 203 | 10.00 AM | 10.00 AM | 15 | LIVE | 0.5 | 0.5 |
| Pause | 1 | 203 | 10.15 AM | 10:15 AM | 5 | LIVE | 0.5 | 0.2 |
| Play | 2 | 203 | 10.20 AM | 10:15 AM | 20 | LIVE time shift | 0.6 | 0.1 |
| Stop | | 203 | 10.40 AM | 10.35 AM | | LIVE time shift | | |
| Channel Change | | 204 | 10.40 AM | 10.40 AM | | LIVE | | |
| Record | | Vch01 | 10.40 AM | 10.40 AM | | VIRTUAL | | |
| Play | 3 | Vch01 | 10.40 AM | 10.40 AM | 20 | VIRTUAL | 0.6 | 0.1 |
| Stop | | Vch01 | 11.00 AM | 11.00 AM | | VIRTUAL | | |
| Rewind | | Vch01 | 11.00 AM | | | VIRTUAL | | |
| Stop/Play | 4 | Vch01 | 11.00 AM | 10.40 AM | 10 | VIRTUAL | 0.7 | 0.1 |
| Stop | | Vch01 | 11.10 AM | 10.50 AM | | | | |
| Fast Forward | | Vch01 | 11.10 AM | | | VIRTUAL | | |
| Stop/Play | 5 | Vch01 | 11.10 AM | 10.55 AM | 5 | VIRTUAL | 0.6 | 0.2 |
| Stop | | Vch01 | 11.15 AM | 11.00 AM | 15 | | | |
| SwitchOFF | 6 | | 11.30 AM | | | SessionEND | | |

Event List and Viewer Records (in shaded rows)

KEY:
- ChannelID - channelID of the program represented by this viewer record
- viewing Time - time at which the program is watched.
- epgTme - program time as represented in EPG
- viewing duration - time program watch time
- channelType - represents the channel type and limited event information
  * 15: bit for processed,
  * 13: bit for inactive,
  * 12: bit for session-end,
  * 7-0: channel type: eg Live; Virtual(Recorded); PPV (Pay Per View)
- probability - Probabilities of profile being active when the viewer record is created. This is for a multi-user scenario where the user identity is uncertain and the value is the probability the event action relates to this user (n).

| SESSION TIME | 7PM | 8PM | | 9PM | |
|---|---|---|---|---|---|
| | 30 Minute Slot | 30 Minute Slot | 30 Minute Slot | 30 Minute Slot | 30 Minute Slot |
| Chan -L1 | Live pgm 1 | L pgm A | A | Live pgm H | A | L Pgm A | Live pgm 8 |
| Chan -L2 | Live pgm 2 | Live pgm B | Live pgm I | Live pgm P | Live pgm 9 |
| Chan -L3 | Live pgm 3 | Live pgm C | Live pgm J | Live pgm Q | Live pgm 10 |
| Chan -L4 | Live pgm 4 | Live pgm D | Pgm | K | K | Live pgm R | Live pgm 11 |
| Chan -L5 | Live pgm 5 | Live pgm E | Live pgm L | Live pgm S | Live pgm 12 |
| Chan -L6 | Live pgm 6 | Live pgm 6 | Live pgm 6 | L pgm 6 | 6 | Live pgm 6 |
| Chan -L7 | Live pgm 7 | Live pgmG | Live pgm N | Live pgm U | Live pgm 14 |
| Virt. Chan -V8 | Rec pgm V8 | Rec pgm V8 | Rec pgm V8 | Pgm | V8 | V8 | Rec pgm V8 |
| Virt. Chan -V9 | Rec pgm V9 | Rec pgm V9 | Rec Pgm V9 | V9 | Rec pgm V9 | Rec pgm V9 |
| Virt. Chan -VK | | | Re pgm VK | | |

Record Program:: | ::Program Deleted

FIG 5

| TITLE | TYPE | WATCHED TIME >>>> | AVAILABLE TIME >>>> | RATIO |
|---|---|---|---|---|
| IX()= D.C. 6, 8, V8 | IX(101) | 20+00 +20+00 +00+10+00+10+10 +30 (=100) | 20+10 +20+10 +10+10+10+10+10 +30 (=150) | 0.667 |
| IX()= 8, V8 | IX(101) | 20+00 +00+00 +00+00+00+10+00 +30 (=60) | 20+10 +20+10 +10+10+00+10+10+10 +30 (=150) | 0.4 |
| IX()=A | IX(122) | 00+00 +00+10 +00+00+00+10+00+00 +00 (=20) | 00+00 +20+10 +00+00+00 +00+10+10+10 +00 (=60) | 0.333 |
| IX()= D.C. 9, V9, A | IX(122) | 00+10 +00+10 +10+00+00+10+00+00 +00 (=40) | 20+10 +20+10 +10+10+10+10+10+10 +30 (=150) | 0.2667 |
| IX()=6 | IX(101) | 00+00 +20+00 +00+00+10 +00+00+10 +00 (=40) | 20+10 +20+10 +10+10+10+10+10+10 +30 (=150) | 0.2667 |
| IX()= 9, V9 | IX(122) | 00+10 +00+00 +10+00+00 +00+00+00 +00 (=20) | 20+10 +20+10 +10+10+10+10+10+10 +30 (=150) | 0.1333 |
| IX()= K, VK | IX(777) | 00+00 +00+00 +10+00+00+00+00+00 +00 (=10) | 00+00 +00+00 +10+10 +00+00+00+00 +00 (=30) | 0.333 |

VK Deletion after 20 makes no difference

FIG 6

SESSION TIME: 7PM → 8PM → 9PM

| | 30 Minute Slot | 30 Minute Slot | 30 Minute Slot | 30 Minute Slot | 30 Minute Slot |
|---|---|---|---|---|---|
| Chan -L1 | Live pgm 1 | L pgm A | A | Live pgm H | A | L pgm A | Live pgm 8 |
| Chan -L2 | Live pgm 2 | Live pgm B | Live pgm I | Live pgm P | Live pgm 9 |
| Chan -L3 | Live pgm 3 | Live pgm C | Live pgm J | Live pgm Q | Live pgm 10 |
| Chan -L4 | Live pgm 4 | Live pgm D | Pgm | K | K | Live pgm R | Live pgm 11 |
| Chan -L5 | Live pgm 5 | Live pgm E | Live pgm L | Live pgm S | Live pgm 12 |
| Chan -L6 | Live pgm 6 | Live pgm 6 | Live pgm 6 | 6 | L pgm 6 | 6 | Live pgm 6 |
| Chan -L7 | Live pgm 7 | Live pgmG | Live pgm N | Live pgm U | Live pgm 14 |
| Virt. Chan -V8 | Rec pgm V8 | V8 | Rec pgm V8 | Rec pgm V8 | Pgm | V8 | V8 | Rec pgm V8 |
| Virt. Chan -V9 | Rec pgm V9 | Rec pgm V9 | Rec pgm V9 | V9 | Rec Pgm V9 | Rec pgm V9 | Rec pgm V9 |
| Virt. Chan -VK | | | Re pgm VK | | |

Record Program :: ∷ Program Deleted

FIG 7

| TITLE | TYPE | WATCHED TIME >>>>> | AVAILABLE TIME (OAPD) >>>> | RATIO |
|---|---|---|---|---|
| 1. IX()=DC 6, 8, V8 | IX(101) | 20+00 +20+00 +00+10 +00+10+00 +30 (=100) | 20+10 +20-10 +10+10 +10+10 +10+30 Cap from Pgm Len. =30 | 3.333 |
| 2. IX()= 8, V8 | IX(101) | 20+00 +00+00 +00+00+00 +00+10+00 +30 (=60) | 20+10 +20-10 +10+10+10+10+10+10+30 Cap from Pgm Len. =30 | 2 |
| 3. IX()=DC 9, V9, A | IX(122) | 00+10 +00+10 +10+00+00 +10+00+00 +00 (=40) | 20+10 +20-10 +10+10+10+10+10+10+30 Cap from Pgm Len. =30 | 1.333 |
| 4. IX()=6 | IX(101) | 00+00 +20+00 +00+00+10 +00+00+00 +00 (=40) | 20+10 +20-10 +10+10+10+10+10+10+30 Cap from Pgm Len. =30 | 1.333 |
| 5. IX()= 9, V9 | IX(122) | 00+10 +00+00 +00+00+00 +10+00+00 +00 (=20) | 20+10 +20-10 +10+10+10+10+10+10+30 Cap from Pgm Len. =30 | 0.667 |
| 6. IX()=A | IX(122) | 00+00 +00+00 +00+10 +10+00+00 +00 (=20) | 00+00 +20-10 +00-00+00 +10+10+10+00 Cap from Pgm Len. =30 | 0.667 |
| 7. IX()= K, VK | IX(777) | 00+00 +00+00 +00+10+00 +00+00+00 +00 (=10) | 00+00 +00+00 +10+10+00 +00+00+00 +00 Program Length =30 VK Deletion after 20 makes no difference | 0.333 |

FIG 8

TIME | 7PM | 8PM | 9PM END

| | 30 Minute Slot | 30 Minute Slot | 30 Minute Slot | 30 Minute Slot | 30 Minute Slot |
|---|---|---|---|---|---|
| Chan -L1 | Live pgm 1 | L pgm A | A | Live pgm H | A | L pgm A | Live pgm 8 |
| Chan -L2 | Live pgm 2 | Live pgm B | Live pgm I | Live pgm P | Live pgm 9 |
| Chan -L3 | Live pgm 3 | Live pgm C | Live pgm J | Live pgm Q | Live pgm 10 |
| Chan -L4 | Live pgm 4 | Live pgm D | Live pgm K | Live pgm R | Live | 11 | m 11 |
| Chan -L5 | Live pgm 5 | Live pgm E | Live pgm L | Live pgm S | Live pgm 12 |
| Chan -L6 | Live pgm 6 | Live pgm 6 | Pgm 6 | 6 | L pgm 6 | 6 | Live pgm 6 |
| Chan -L7 | Live pgm 7 | Live pgmG | Live pgm N | Live pgm U | Live pgm 14 |
| Virt. Chan -V8 | Rec pgm V8 | Rec pgm V8 | L pgm V8 | V8 | Pgm | V8 | V8 | Rec pgm V8 |
| Virt. Chan -V9 | Rec pgm V9 | Rec pgm V9 | Rec pgm V9 | -V9 deleted | |
| Virt. Chan -V10 | Rec pgm V10 | Rec pgm V10 | Rec pgm V10 | Rec pgm V10 | Rec pgm V10 |

FIG 9

| TITLE | TYPE | WATCHED TIME >>>>> | AVAILABLE TIME (OAPD) >>>> | RATIO |
|---|---|---|---|---|
| 1. IX()=D.C. (6, 8, V8) | IX(101) | (No Fwd), Total from here =220 | (No Fwd), Average from here =30 | 7.333 |
| 2. IX()= 8, V8 | IX(101) | 30 +00+00 +00+10 +00+10+00 +10+00+00 (Fwd=70) Total=130 | 30 +20+10 +20+10 +10+10+10 +10+10+00 (Fwd=30), 1x cap 00, Total=30 | 4.333 |
| 4. IX()=6 | IX(101) | 00 +20+00 +20+00 +00+00+10 +00+00+00 (Fwd=40) Total=90 | 30 +20+10 +20+10 +10+10+10 +10+10+00 (Fwd=30), 1x cap 00, Total=30 | 3 |
| 3. IX()=D.C. (9, V9, A) | IX(122) | (No Fwd), Total from here =60 | (No Fwd), Average from here =30 | 2 |
| 6. IX()=A | IX(122) | 00 +00+10 +00+00 +10+00+00 +00+00+00 (Fwd=20) Total=40 | 00 +20+10 +00+00 +10+10+10 +00+00+00 (Fwd=30), 1x cap 00, Total=30 | 1.333 |
| n. IX()=11 | IX(535) | 00 +00+00 +00+00 +00+00+00 +00+10+00 (New) Total=10 | 00 +00+00 +00+00 +00+00+00 +10+10+00 (New) Total=20 | 0.5 |
| 5. IX()= 9, V9 | IX(122) | 00 +00+00 +00+00 +00+00+00 +00+00+00 (Fwd=20) Total=20 | 30 +20+10 +20+10 +00+00+00 +10+10+00 (Fwd=30), 1x cap 00, Total=30 | 0.667 |
| 7. IX()= VK | IX(777) | 00 +00+00 +00+00 +00+00+00 +00+00+00 (Fwd=10) Total=10 | 00+00 +00+00 +10+10+00 +00+00+00 +00 (Fwd=30), 1x cap 00, Total=30 | 0.333 |

FIG 10

TIME: 7PM — 8PM — 9PM

| | 30 Minute Slot | 30 Minute Slot | 30 Minute Slot | 30 Minute Slot |
|---|---|---|---|---|
| Chan -L1 | ----- Live pgm A ----- | | ----- Live pgm A ----- | Live pgm X |
| Chan -L2 | Live pgm 2 | Live pgm B | Live pgm I | Live pgm Y |
| Chan -L3 | Live pgm 3 | Live pgm C | Live pgm J | Live pgm 10 |
| Chan -L4 | Live pgm 4 | Live pgm D | Live pgm K | Live pgm 11 |
| Chan -L5 | Live pgm 5 | Live pgm E | Live pgm L | Live pgm 12 |
| Chan -L6 | Live pgm 6 | Live pgm 6 | Pg 6 / 6 / ---6 still--- | Live Pgm 6 |
| Chan -L7 | Live pgm 7 | Live pgm G | Live pgm N | Live pgm 14 |
| Virt. Chan -V8 | Rec pgm V8 / V8 | Rec pgm V8 | L pgm V8 / V8 | Rec pgm V8 |
| Virt. Chan -V9 | Rec pgm V9 / V9 | Rec pgm V9 | V9 / pgm V9 | Rec pgm V9 |
| Virt. Chan -V10 | Rec pgm V10 | Rec pgm V10 | Rec pgm V10 | Rec pgm V10 |

FIG 11

| TITLE | TYPE | WATCHED TIME >>>>>> | AVAILABLE TIME >>>> | RATIO |
|---|---|---|---|---|
| IX()=X | IX(155) | 00+00 +00+00 +00+00+00 +00+00+00 +30 (=30) | 00+00 +00+00 +00+00+00 +00+00+00 +30 (=30) | 1 |
| DC,6-V8 | IX(101) | 20+00 +20+00 +10+10+10 +00+10+10 +00 (=80) | 20+10 +20+10 +10+10+10 +10+10+10 +30 (=150) | 0.5333 |
| IX()=V8 | IX(101) | 20+10 +00+00 +00+10+10 +00+10+00 +00 (=40) | 20+10 +20+10 +10+10+10 +10+10+10 +30 (=150) | 0.2667 |
| IX()=6 | IX(122) | 00+00 +20+00 +00+10+00 +00+10+00 +00 (=40) | 20+10 +20+10 +10+10+10 +10+10+10 +30 (=150) | 0.2667 |
| DC,A-V9 | IX(122) | 00+10 +00+10 +00+00+00 +10+00+00 +00 (=40) | 20+10 +20+10 +10+10+10 +10+10+10 +30 (=150) | 0.2667 |
| IX()=A | IX(122) | 00+00 +00+00 +10+00+00 +10+00+00 +00 (=20) | 20+10 +20+10 +10+10+10 +10+10+10 +00 (=120) | 0.1667 |
| IX()=V9 | IX(122) | 00+10 +00+00 +10+00+00 +00+00+00 +00 (=20) | 20+10 +20+10 +10+10+10 +10+10+10 +30 (=150) | 0.1333 |

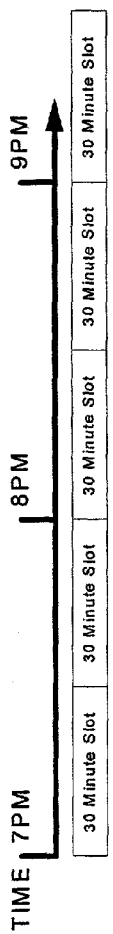

| TITLE | TYPE | WATCHED TIME >>>>>> | AVAILABLE TIME (OAPD) >>>>> | RATIO |
|---|---|---|---|---|
| IX()=DC 6, V8 | IX(101) | 20+00 +20+00 +00+10+10 +00+10+10 +00 (=80) | 20+10 +20+10 +10+10+10 +10+10+10 +30 (Cap from Ave Pgm Len: 30/2+60/2=45) | 1.778 |
| IX()=V8 | IX(101) | 20+00 +00+00 +00+00+10 +00+00+10 +00 (=40) | 20+10 +20+10 +10+10+10 +10+10+10 +30 (Total=150, cap from Pgm Len.) =30 | 1.333 |
| IX()=X | IX(199) | 00+00 +00+00 +00+00+00 +00+00+00 +30 (=30) | 00+00 +00+00 +00+00+00 +00+00+00 +30 (=30) | 1.0 |
| IX()=DC A, V9 | IX(122) | 00+10 +00+10 +10+00+00 +10+00+00 +00 (=40) | 20+10 +20+10 +10+10+10 +10+10+10 +30 (Cap from Ave Pgm Len: 30/2+60/2=45) | 0.889 |
| IX()=6 | IX(101) | 00+00 +20+00 +00+10+00 +00+10+00 +00 (=40) | 20+10 +20+10 +10+10+10 +10+10+10 +30 (Total=150, cap from Pgm Len. =60) | 0.667 |
| IX()=V9 | IX(122) | 00+10 +00+00 +10+00+00 +00+00+00 +00 (=20) | 20+10 +20+10 +10+10+10 +10+10+10 +30 (Total=150, Cap from Pgm Len. =30) | 0.667 |
| IX()=A | IX(122) | 00+00 +00+10 +00+00+00 +10+00+00 +00 (=20) | 20+10 +20+10 +10+10+10 +10+10+10 +00 (Total=120, Cap from Pgm Len. =60) | 0.333 |

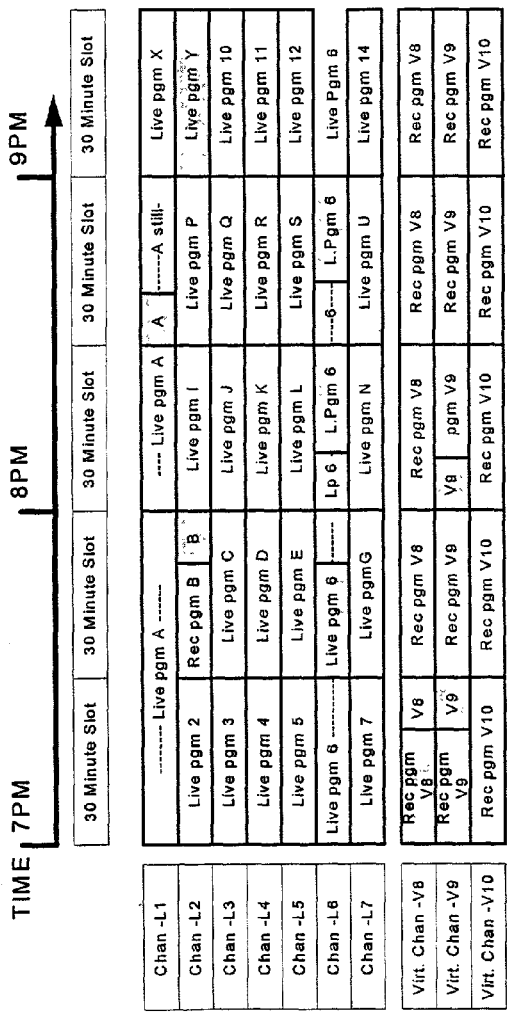

FIG 16

TIME 7PM — 8PM — 9PM

| | 30 Minute Slot | 30 Minute Slot | 30 Minute Slot | 30 Minute Slot |
|---|---|---|---|---|
| Chan -L1 | ----- Live pgm A ----- | | ---- Live pgm A ---- | A | ----A still---- |
| Chan -L2 | Live pgm 2 | Rec pgm B | B | Live pgm I | Live pgm P |
| Chan -L3 | Live pgm 3 | Live pgm C | Live pgm J | Live pgm Q |
| Chan -L4 | Live pgm 4 | Live pgm D | Live pgm K | Live pgm R |
| Chan -L5 | Live pgm 5 | Live pgm E | Live pgm L | Live pgm S |
| Chan -L6 | Live pgm 6 ------ | Live pgm 6 | Lp 6 | L.Pgm 6 | ---6---| L.Pgm 6 |
| Chan -L7 | Live pgm 7 | Live pgmG | Live pgm N | Live pgm U |
| Virt. Chan -V8 | Rec pgm V8 | V8 | Rec pgm V8 | Rec pgm V8 | Rec pgm V8 |
| Virt. Chan -V9 | Rec pgm V9 | V9 | Rec pgm V9 | pgm V9 | V9 | pgm V9 | Rec pgm V9 |
| Virt. Chan -V10 | Rec pgm V10 | Rec pgm V10 | Rec pgm V10 | Rec pgm V10 |

FIG 17

| TITLE | TYPE | WATCHED TIME >>>>> | AVAILABLE TIME (OAPD) >>>> | RATIO |
|---|---|---|---|---|
| 1. IX()=DC 6, V8 | IX(101) | (No Fwd), Total from here =160 | (Observe Fwd=45), Average from here =45 | 3.556 |
| 2. IX()= V8 | IX(101) | 20+00 +00+00 +00+00+00 +00+00+00 +00 (Fwd=40) Total=60 | 20+10 +20+10 +10+10+10 +10+10+10 +30 (Fwd=30), 1x cap 00, Total=30 | 2 |
| 4. IX()= 6 | IX(101) | 00+00 +20+00 +00+10+00 +10+10+10 +00 (Fwd=40) Total=100 | 20+10 +20+10 +10+10+10 +10+10+10 +30 (Fwd=60), 1x cap 00, Total=30 | 1.667 |
| 5. IX()=DC A, V9 | IX(122) | (No Fwd), Total from here =70 | (Observe Fwd=45), Average from here =45 | 1.556 |
| 6. IX()= V9 | IX(122) | 00+10 +00+00 +10+00+00 +00+00+00 +00 (Fwd=20) Total=40 | 20+10 +20+10 +10+10+10 +10+10+10 +30 (Fwd=30), 1x cap 00, Total=30 | 1.333 |
| 7. IX()= X | IX(199) | 00+00 +00+00 +00+00+00 +00+00+00 +00 (Fwd=30) Total=0 | 00+00 +00+00 +00+00+00 +00+00+00 +30 (Fwd=30), 1x cap 00, Total=30 | 1 |
| 3. IX()= Y | IX(155) | 00+00 +00+00 +00+00+00 +10+10+10 +00 (New) Total=30 | 00+00 +00+00 +00+00+00 +00+00+00 +30 Total=30 | 1 |
| 9. IX()= A | IX(122) | 00+00 +00+00 +00+00+00 +10+00+00 +00 (Fwd=20) Total=30 | 20+10 +20+10 +10+10+10 +10+10+10 +00 (Fwd=60), 1x cap 00, Total=60 | 0.5 |
| 8. IX()= B | IX(203) | 00+00 +00+10 +00+00+00 +00+00+00 +00 (New) Total=10 | 00+00 +20+10 +00+00+00 +00+00+00 +00 (New) Total=30 | 0.333 |

| V.1, Available Time Cap: One program per session (OAPDPS) = 2 total | | | | V.Alt, Available Time Cap: One program per accounting period (OAPD) = 1 total | | | |
|---|---|---|---|---|---|---|---|
| TITLE | TYPE | RATIO | | TITLE | TYPE | RATIO | |
| | | | | 1. IX()=DC 6, V8 | IX(101) | 3.556 | |
| | | | | 2. IX()= V8 | IX(101) | 2 | |
| 1. IX()=DC 6, V8 | IX(101) | 1.778 | | 4. IX()= 6 | IX(101) | 1.667 | |
| | | | | 5. IX()=DC A, V9 | IX(122) | 1.556 | |
| | | | | 6. IX()= V9 | IX(122) | 1.333 | |
| 2. IX()= V8 | IX(101) | 1 | | 7. IX()= X | IX(199) | 1 | |
| 3. IX()= Y | IX(155) | 1 | | 3. IX()= Y | IX(155) | 1 | |
| 4. IX()= 6 | IX(101) | 0.833 | | | | | |
| 5. IX()=DC A, V9 | IX(122) | 0.778 | | | | | |
| 6. IX()= V9 | IX(122) | 0.667 | | | | | |
| 7. IX()= X | IX(199) | 0.5 | | 9. IX()= A | IX(122) | 0.5 | |
| 8. IX()= B | IX(203) | 0.333 | | 8. IX()= B | IX(203) | 0.333 | |
| 9. IX()= A | IX(122) | 0.25 | | | | | |

FIG 18

SYSTEM AND METHOD FOR GENERATING AND MANAGING USER PREFERENCE INFORMATION FOR SCHEDULED AND STORED TELEVISION PROGRAMS

CROSS-REFERENCE TO RELATED APPLICATIONS

This application claims the benefit under 35 U.S.C. §119(e) of provisional application No. 60/293,763, filed May 25, 2001.

This application is also a continuation-in-part under 35 U.S.C. §120 of commonly assigned U.S. patent application Ser. No. 09/096,592, filed Jun. 12, 1998, entitled "Television Program Recording with User Preference Determination," now U.S. Pat. No. 6,614,987, which is herewith incorporated by reference.

Further reference is had to our copending, commonly assigned U.S. patent application Ser. No. 10/156,173 entitled "Database Management System and Method for Electronic Program Guide and Television Channel Lineup Organization," filed May 28, 2002, which is herewith incorporated by reference.

BACKGROUND OF THE INVENTION

FIELD OF THE INVENTION

The invention lies in the field of interactive television programming. Specifically, the invention pertains to the generation and management of user preference information concerning scheduled and recorded programs. The invention relates to computer-based DTV technology with program storage and intelligent agents for automatically selecting programs for the viewer in devices such as DTVs, STBs, PDRs, and PVRs.

Determination of a television user's program viewing preferences is an important function in the context of digital TV (DTV) and digital set top boxes (STB, DSTB)—especially those with program storage capability—for a variety of applications. Specifically, viewing preferences are required to support applications that select for the user, for example:

data for a personalized electronic program guide (EPG);
audio/visual (AV) programs or content for viewing later at a convenient time;
segments and ads for compilation into a sequence of programs or a separate channel, such as a virtual channel.

For the purpose of personalizing current TV program availability and for determining which programs to record, it is necessary to learn the program preferences of the TV and PDR user. No suitable prior art systems exist that provide a process and software agents enabled to generate and maintain viewer preference information with the detail necessary to allow personalization at a sophisticated level.

SUMMARY OF THE INVENTION

It is accordingly an object of the invention to provide a system and method for the generation and the management of user preference information concerning scheduled and recorded programming, which overcomes the above-mentioned disadvantages of the heretofore-known devices and methods of this general type and which provides for easily manageable data structures and manageable algorithms for user preference generation modeling and storage.

With the foregoing and other objects in view there is provided, in accordance with the invention, a method of personalizing television program availability, which comprises:

observing user activity and program behavior of a television program user over a period of time;
cross-referencing individual programs of a list of available programs against a viewing behavior of the television program user; and
generating from the user activity and the program behavior preference profile information and storing the preference profile information in a relational database.

In accordance with an added feature of the invention, the method steps are effected with software agents such as a viewing record module agent (VRM) and a program information viewing history agent (CDM).

In accordance with an additional feature of the invention, the software agents operate with built-in algorithms operating on user activity and other events to produce the preference profile information in a special purpose relational database (CDB). Preferably, the software agents are programmed to operate on data items such as data representing user control events, external EPG information, click-stream data, viewing records, channel lineup lists, and a string table representing internal program lineup availability.

In accordance with another feature of the invention, a program history relational database (CDB) is defined for preference determination with index numbers representing external program information text strings.

In accordance with a further feature of the invention, maintenance operations are defined for the relational database including creating, changing, generalizing, enhancing, and expanding program information category data rows in the database.

The relational database is continually updated by accumulating time information, program information, and category data row items when a program is watched, i.e., with data-dependent input accumulating available time for viewing per each data program information category data row.

In a preferred embodiment, the database contains a number of forms of pre-processed information i.e. accumulations of time and already split category rows, enables speedy and simple database accesses to discover preference, that is, pre-processed preference ratings. The preprocessed information is then selected by database access commands and the selection completes the processing. The fact that preference rating is pre-processed in the database makes the database access (e.g. looking for the most preferred program) much simpler and faster because most of the acquisition and processing work is already done and does not have to be done at access time.

In accordance with a preferred and efficient feature of the invention, a user's preference is defined with a ratio of watched time over available time of a given program or category.

In accordance with again another feature of the invention, available time of a given program or category is capped for repeated live programs and stored programs. The value may be capped at one program time or one program time per session. This feature makes preference rating of repeated live programs and stored/recorded (S/R) programs work. A cap of (1) one program time for ever or a cap of (2) one program time per session allows S/R programs to have a realistic rating that either does not decay (1) or decays slowly (2) for just being present and available. The user likes a given show but simply does not want to watch it all the time.

In accordance with again an additional feature of the invention, available time is only accumulated after the program or category is first watched and/or watched time is only accumulated after the program or category is watched for a given minimum time.

The management system outlined above is particularly suitable in the context of a preference determination engine in a television broadcast system. In that case, the management system includes a database containing program information and viewing history of at least one user of the television system.

In further summary, a internal electronic program guide (EPG) manager (IEM), creates and maintains an internal EPG (IE) information database for the user program preference determination engine (PDE), which is resident in a STB, DTV or PVR. The term internal, as used herein, refers to the fact that the EPG data are for use by software agents of the PDE and are not used to make the main system graphical user interface EPG. The external EPG is used for that purpose. The IEM provides other software agents with various control interfaces to enable extraction of the program information from the IE database, for maintenance and to update changes, e.g. channel-line-up changes, that arise from changes to the external EPG.

In a preferred embodiment, the viewing record module (VRM) responds to filtered user events and program changes to save program information in an initial database, the viewing record database (VRDB). Many event trigger types, such as power off, skip, channel change and play, cause program information to be saved (e.g., time, channelID, channelType) as a record in the VRDB. Some event types, such as session-end are also saved using data bits inside channelType. The VRDB information database serves as the input for the CDM agent to process and build records in a program information viewing history database, here referred to as the category database (CDB).

The CDM agent further processes the pre-processed VRDB records to produce the CDB. The result of the processing is that actual Watched time and Available time (including Watched and not Watched) accumulations are made for programs and content categories (e.g., type, cast, genre) for each user so they can be used to indicate their relative preference relative, for example, program to program, content to content, etc.

VRDB records are processed by the CDM and then deleted from the VRDB. CDM processing for recorded program activity is slightly different to that for live program activity.

In a multi-user scenario, the items watched and available time are accumulated separately for each user and the time added is multiplied by the determined probability of being each user.

Program preference computation using program information history and accumulated times, specifically WatchedTime versus AvailableTime produces a reading of preference of one program relative to another program with program length, frequency of availability removed as factors and repeatedly available programs also included. This renders the system simple and implementable.

Corner-case AvailableTime Computation:

Available time may be capped for repeatedly available live programs or permanently available (recorded) programs where only one program length ever, or per viewing time period, e.g. session, is accumulated. This treatment allows their time to be included in the preference calculation for a better overall result.

The CDB database is managed and controlled with reference to each database data row. Over the lifetime of the database, the rows may be subject to:

Planned data obsolescence by forced decay of the preference ratio is introduced by adding AvailableTime periodically -even if there is no actual program (or content) availability CDB row deletion based on preference ratio deletion threshold level.

In a further preferred system, there is provided a graphic user interface (GUI) for user control of CDB database management settings. The following settings may be influenced:

AvailableTime Cap value for Repeated and Recorded Programs,

WatchedTime boost value for PPV programs,

Rate values i.e. AvailableTime add and period, for forced Decay of Preference Ratio, Value of Preference Ratio minimum i.e. deletion threshold, Other features which are considered as characteristic for the invention are set forth in the appended claims.

Although the invention is illustrated and described herein as embodied in a system and method for generating and managing user preference information for scheduled and recorded television programs, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWING

FIG. 2 is a detailed schematic block diagram illustrating a preference determination engine including the part that directly relates to the formation of the preference profile data in the viewing history database (CDB) according to the invention;

FIG. 3 is a table and an associated legend, the table showing an event list and viewer records (in shaded rows);

FIGS. 4-17 show pairs of related tables recording watched/available time for TV viewing sessions with consecutive 30 minute and 60 minute time slots broken into 10 and 20 minute periods of viewed program coverage, and the related generation of a preference rating; and FIG. 18 is a table showing a comparison between the preference ratios from the tables in FIGS. 15 and 17.

DESCRIPTION OF THE PREFERRED EMBODIMENTS

Figure 1:
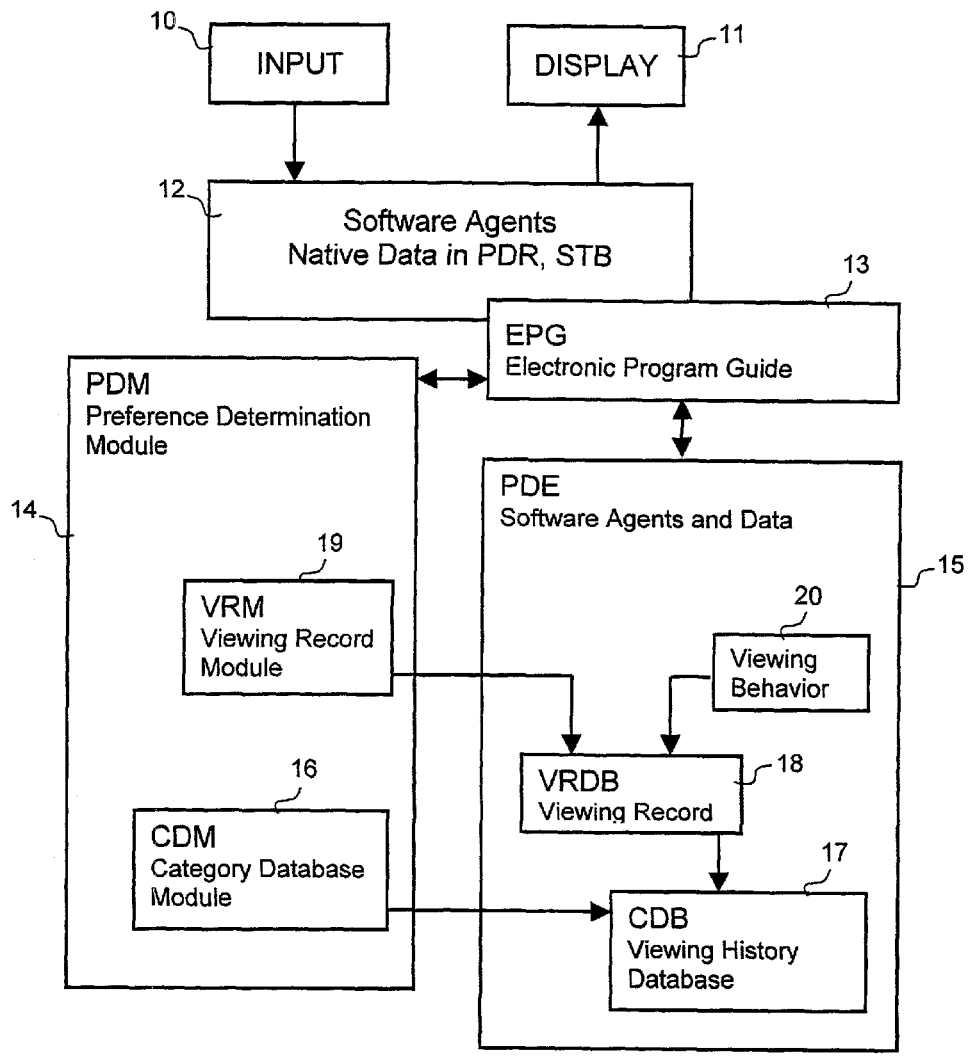
FIG. 1 is a block diagram providing an overview over the architecture of a novel preference determination engine.

Referring now to the figures of the drawing in detail and first, particularly, to FIGS. 1 and 2 thereof, there is illustrated a complete preference determination engine (PDE) software architecture in which the method and system according to the invention is integrated. FIG. 1 is a simplified block diagram of the more detailed architecture of FIG. 2. The input block 10 represents the various input sources from which the system draws. These sources include, for instance, a cable hookup, a broadcast antenna, a satellite decoder, a video source (including optical disks and similar storage devices), a user click stream, generalized demographic information, and so on. The display block 11 refers to a screen and a graphics control output for a user interface GUI. Various software agents and data that are native in all PDR or set top box (STB) systems are combined in a top level block 12. An electronic program guide EPG 13, i.e., the block 13, shows the source of the data for the computation in the lower level blocks, i.e., the internal system level. The latter, which forms the program and data system of the preference determination engine PDE is explained in two blocks, namely, a preference determination module PDM 14 and the PDE software agents and data 15. The software agents comprising the preference determination module PDM 14 perform operations on data in the software and data block 15. The core system of the PDM 14 is the category database module CDM 16 which defines a user program preference database or category database CDB 17. The latter is also referred to as a program information and viewing history database 17. One of the primary inputs into the CDB 17 originates from the viewing record database VRDB 18. The viewing record database VRDB 18 draws its information from a viewing record model VRM 19 and from a viewing record behavior agent 20. The category database module CDM 16 of the preference determination module PDM 14 manages CDB creation and maintenance.

Reference is had to copending application Ser. No. 10/156,173 which deals primarily with the generation and maintenance of a channel lineup list to be utilized in the PDM 14 and which deals mainly with the system for the formation and for changing channel lineup lists. As noted above, the copending application is incorporated by reference.

The following description provides detailed information concerning the viewing record module agent and the database. Reference is first had to FIG. 3.

User control actions or events from the click stream data originating at the input 10 are input to the VRM agent in order to make the VRDB database of information about the programs the viewer watched. Exemplary PDR and user event types will be listed below.

Some of the events are pre-filtered out as containing too little information to be worthwhile recording. For example, the following is a suitable filter list:
- if channel viewing time is less than 7 seconds—do not make a record
- if. channel viewing time is greater than 7 seconds—keep intermediate records
- if channel viewing time is greater than 5 minutes—process the intermediate records to split the records into multiple records, one for each program watched in the time.

In the case of the first filter (viewing <7 min), the information is deleted and does not become a viewer record. Also some of the events, for instance Stop, Channel Change do not signify program viewing and so are noted but do not result in a separate viewer record, until the play event. The play event signifies viewing of something either a buffered live program or stored (virtual) program, and at this point a record is logged.

The probability columns, of a given user being active for each record row, are filled in later by a different agent called the PIM module. Numbers between 0 and 1 are used where 1 indicates certainty that this is the user. This is required for determining preferences for each user in the common multi-user household situation.

For the case, that a user stayed on one channel for a long time and the program changed without a user event then the VRM agent observes this situation and creates a VRDB record at every program change boundary. This ensures that the viewing duration pertains to one program only.

The following lists the types of user events or trigger types:
POWER_ON; POWER_STANDBY;
REWIND; FAST_FORWARD; PAUSE; RESUME; PLAY; RECORD; STOP;
JUMP_TO_LIVE; CHANNEL_CHANGE; LINE-UP_CHANGE; END_CHANNEL;
SKIP_BACKWARD; SKIP_FORWARD;
ADD_CHANNEL; DELETE_CHANNEL;

The following information is evident from the entries in the table of FIG. 3:

Record 0, shows a channel 203 is Played Live for 15 minutes.

Record 1, shows the viewing was Paused for 5 minutes. At this point, the program is backed up in the buffer and the program continues to be backed up to the buffer size limit.

Record 2, shows the Pause is removed and the program continues Playing for 20 minutes.

This is now time-shift-viewing. The PDR software still sees this as LIVE viewing and only switches to VIRTUAL if Record is set, or the program rewound to the beginning by the user and Record then set (to record all the program).

Depending on the size limit of the time shift buffer and the length of the program then rewinding to the beginning might not be possible. The Actual Program EPG Time keeps track of the actual viewing position within the program. If the buffer limit is reached (wrap-around) then other agents (TSM and PTM modules) come in to play to adjust the Actual Program EPG Time as the initial program material is lost.

Record 3, shows the previous viewing was stopped, the Channel was changed and Record was set prior to re-starting Viewing for 20 minutes. Now this is marked as Virtual Channel. Note that the original TV channel ID is not saved in the VRDB but the information is saved by the Storage Manager Agent and is required later by the CDM.

Record 4, shows the program was then Stopped and Rewound. Viewing commenced from the beginning time (back 20 minutes) for 10 minutes with the Time Shift viewing marked as Virtual Channel and the Program being stored rather than being temporarily buffered.

Record 5, shows the program was Fast Forwarded within the recorded (Virtual) program and Playing Resumed for 5 more minutes.

Record 6, shows the unit was switched off 15 minutes later. This Viewer Record shows Session End.

The category database module agent (CDM) runs every 4 minutes to process the viewing record database (VRDB) information with EPG information to make the final stage preference determination database the CDB. In essence, this is a custom database operation where information from two databases is used to create a third database. The ultimate goal is to make a final set of data that can be used to indicate which program or content type categories are liked relative to others, in a way that is efficient and speedy.

The operation effectively compresses the viewing history data as it is written to the CDB, by taking replicate program viewing instances initially in multiple VRDB rows, and instead accumulating the watched time and instance count in one CDB row. In another operation, there is some expansion of data rows. Here a third row is made for two rows with some matching column data (usually program content ie category, type or genre) where non-matching column data (eg title) is marked as 'don't care'. The end requirement for the CDB is that the most preferred program or content-data, based on accumulated time, is easily observable. The database expansion enables that speedy discovery, as only the comparison of times of already prepared category rows is required.

A final CDM operation is to make another CDB time data column giving an Available Time for each distinct program or content category data row. This is an accumulation of program time available for viewing while the unit is powered on. Available Time is computed for EPG listed (Live) programs with some history of being viewed, or recorded programs, which could have been selected for viewing but were partially watched or not watched at all. The resultant Available Time accumulation enables a more accurate determination of preference by a relative measure of e.g. time 'action-movie' actually watched versus time 'action-movie' was available.

While accumulated time watched (Time Watched) alone can indicate a program or content category is liked (if a significantly large time is accrued) it can cause liked but infrequently available or short programs or categories to go unnoticed because their accumulated time is inherently less. The ratio of watched versus available time is therefore a superior measure of preference compared to watched time alone.

Computation of available time is complicated by the permanently available Recorded Programs and by any pseudo-permanent repeated Live programs, which would accumulate over-large amounts of available time. Therefore, a strict definition of 'Available' is not used; instead, a definition 'Available-and-expected-to-be-viewed' is adopted. Therefore, even though a program may be continually or permanently available only one expected full viewing per time period e.g. session, is counted for the available time accumulation.

There is no established industry definition of preference in the program viewing sense. The technology used here pertains to definitions for Metabyte Networks, Inc. by the computation details determined to produce an appropriate relative preference result i.e. an appropriate order when the programs are sorted in order based on the computed Metabybe Networks preference from highest to lowest.

As an alternative approach, the need for the CDB and CDM processing could be avoided if the VRDB and EPG information were kept for a long time. Use of more complex database search and select functions could replace the need for the CDB at the cost of retaining very large VRDB and EPG database storage.

However, this unwieldy approach would inhibit the long-term learning and retention of preferences. Discovery of preferences involving multiple searches while technically possible would be also unwieldy and unsuitable for limited performance consumer electronics.

The CDM agent operates primarily to create CDB rows and time-watched values. Viewing records are read from the VRDB by the CDM after one complete session (up to power off).

EPG program information in the form of a set of indices is fetched to match VRDB information, i.e., ChannelID, Actual Program Time, ChannelType, to make CDB database records. These indexes are created when EPG information parameter strings are entered in the String table and are a set of references to program and content information text from programs the user has viewed.

If the ChannelType is Live then the internal electronic program guide (IEPG) agent is queried for the set of indexes. If the ChannelType is marked as virtual (a recorded program) then the original ChannelID must be first obtained from the SDM (which maintains the recorded program EPG information) for the program content set of indexes.

In a first step, the retrieved set of indexes, for one VRDB row, is compared to indexes already in the CDB. If there is no existing CDB record with the same set of indexes then the CDM creates one such record and puts it into the CDB as a row in the database (this is also referred to as a Liking Record). The viewing duration value from the VRDB, multiplied by the VRDB probability of being each user, is used as the Watched-Time-for-User column values in this new row. If there is an existing CDB row with the same set of indexes then the VRDB viewing duration value, multiplied by the VRDB probability of being each user, is added to the existing Watched-Time-for-User values thus accumulating time.

In addition to this type of automatically learned record, a user may interact directly to make entries describing desired programs or content eg actor names. Also, when a CDB row is created for a program, the ChannelType of the program is checked. If ChannelType is Pay Per View, then the ChannelType category in the CDB data is ignored and is set to DC (don't care).

The next step is to determine, for this one input, whether the creation, in the CDB, of one or more than one record, is appropriate. The CDM searches the CDB for existing records where some of the EPG parameter values (indexes) are the same. For each such matching column or number of columns, a new row record is created which consists of only the matched columns and a DC (don't care) symbol is inserted in the columns that did not match. This has the effect of making more records, ones that match more easily and which correspond to more broad program information. In later stages of CDM processing, time is added to those records that match and the ones that have more time added will stand out and show preference. The broader the program information of the CDB database row the more likely it is to accrue time and stand out.

For example, 'News' (represented by an index number) alone on a row is broad and will match more often than the narrower 'News' AND 'FoxChannel' AND 'LateNewsPgm' together on a row. The broader types will normally accrue more total watched time and therefore indicate a preference for this type of program content parameter.

Consider the following example: Let the EPG parameters be Channel Parameter, Program Type & Title. Let one of the existing CDB rows comprise of the parameter values of (CNN, News, Evening News)

respectively. Let the new record to be inserted comprise the parameter values (FOX NEWS, News, Fox News)

respectively. At the time the above record is inserted, an additional record is also inserted which comprises (DC, News, DC).

Here DC refers to a predefined value (to signify a Don't Care condition) which would be considered a match with all parameter values that it is compared with. For example liking records comprising (CNN, News, Evening News) and (DC, News, Evening News)

are considered to be completely matched.

The CDB, Time-Available-per-User columns are filled or updated when a Session End record is encountered in the VRDB. All VRDB records up to this point relate to the current session because they are deleted at the end of the current session CDM processing.

For every live program available in this session period, obtained from the EPG data, the matching CDB program and related category data rows (from the expansion) have their Available-Time-per-User updated. The value used is the whole program duration (falling within the session duration) multiplied by the probability of being the user. For recorded Programs, the EPG data is obtained from the SDM instead of the live program guide.

For all programs repeatedly available in one session, i.e., live programs repeated in one session or recorded programs, which are permanently available, a different treatment is in order as follows. The available time is accumulated for the session but capped at the maximum of one program length quantity of available time falling within the one session to prevent an over-large value being accumulated. This is justified by saying that however much a program is liked only one viewing per session could normally be expected. The actual time value used is multiplied by the probability of being the user** and added to matching CDB rows accumulated available time per session regardless of whether it was watched or not. New records are not made for available time accumulation unless there is also watched time in the session.

For a CDB category (e.g. genre) type row with specific DC (Don 't cares, e.g. instead of Title) derived from or to be contributed-to from two other rows (without the DC's) which represent programs of different lengths then the Available-Time cap value is the average of the two contributing rows program lengths.

For example for an 'action-movie' of 120 minutes length, (120*0.9) minutes are added to the 'action-movie' category row, 'Time-available-user-1' column where 0.9 is the probability of being 'User-1'.

STR Category, Stars
  Index [name; name . . . ]
PTT Category, Program Title
  Index [Kids in the hall; Bronx rumbles; . . . ]
CTRY Category, Country
  Index[ USA; GB; India; . . . ]
MPAA Category, MPAA Rating
  Index[ PG-13; Restricted; . . . ]
TWA(1 . . .n) Accumulated time of programs, segments or content type category, of this row type, actually Viewed or Watched.
TAV(1 . . .n) Accumulated time of programs, or content type category of this row type, Available to be selected. An accumulation of whole times for matching viewed programs and matching programs listed in the EPG for this session time (unit is powered on) but which weren't watched as alternative live or recorded programs were being watched. Only one whole program time is added (to Available-time) per session per recorded program.
CNVR Count-of-Contributing-Viewer-Records (count of updates to values in this row).

| RNO | PTY | CHN | CAT | STR | CTRY | MPAA | PTT | T-WA (user 1) | T-AV (user 1) | T-WA (user 2) | T-AV (user 2) | CNVR |
|---|---|---|---|---|---|---|---|---|---|---|---|---|
| 1 | EPI | ABC | COM | DC | US | NR | 0 | 0 | 0 | 0 | 0 | 0 |
| 2 | EPI | TNN | COM | DC | GB | NR | Kids in the Hall | 30 | 60 | 15 | 15 | 1 |
| 3 | EPI | TNN | Music | Carey | US | G | DC | 0 | 0 | 15 | 15 | 1 |
| 4 | Mov | TNN | Action | Chan | US | R | Bronx Rumbles | 60 | 60 | 15 | 15 | 1 |
| 5 | EPI | TNN | COM | Jane | US | PG-13 | For your love | 20 | 20 | 0 | 0 | 1 |
| 6 | EPI | ABC | Music | DC | GB | G | DC | 15 | 45 | 0 | 0 | 1 |
| 7 | EPI | ABC | Music | DC | US | G | DC | 10 | 60 | 45 | 45 | 1 |
| 8 | EPI | DC | News | 0 | US | G | DC | 15 | 15 | 15 | 45 | 1 |
| 9 | EPI | CNN | News | 0 | US | G | Evening News | 0 | 0 | 30 | 30 | 1 |
| 10 | EPI | FOX-News | News | 0 | US | G | Fox News | 0 | 60 | 0 | 0 | 1 |

It is possible for a repeated program to be watched a number of times per session even though the available time is only accumulated one program time per session. This can result in a Watched/Available Time Ratio value greater than one, which is permitted.

Available Time is defined as follows: available time is the maximum expected Watch Time of category type (e.g. Program Title) per time period e.g. session for programs live or recorded, and is one full program length of time. The Watched/Available Preference Ratio produced is effectively normalized to one program length i.e. Wa/Av =1. Repeat watching is not expected though is noted and the ratio value can rise above 1.

The following table illustrates an exemplary embodiment of the program information viewing history database CDB The following table keys are used:
RNO Record Number
DC Don't Care (matches all)
PTY Program Type e.g.:
  Index [Episode -EPI, Show, Movie -Mov, Documentary . . . ]
CHN Channel Name i.e.
  Index[ABC; TNN; CNN . . . ]
CAT Category, Genre e.g.:
  Index [Comedy -COM; Music, Action-movie, News . . . ]

The example in this table shows some CDB rows and values. In actuality the text strings are converted to Index number of the String-Table structure or array prior to use here. This is sufficient for the database matching operations and if the original text is required then this can be obtained by look-up in the string table.

The table shows two users are noted and watched and available times are accumulated individually to enable determination of individual user preference.

The term Preference is an unscientific, human-oriented term, perception of which can vary somewhat from person to person. This text provides a definition of preference for use in the Metabyte Networks Inc. system and an implementation in a formula that enables its computation.

Preference in this case is the user preference for programs calculated by accumulating the time each program or program type is actually Watched. Thus, the more a program is watched the more time is accumulated and the more it stands out as preferred, however, watched time alone can give a false reading of preference, as it doesn't take into account the availability or length of the program.

Therefore, the MNI definition of preference is the ratio of Watched Time versus 'Available' Time. Programs watched in their entirety every time they occur incur a maximum value of 1 while programs that are partially watched incur values less than 1. Also, program length is not now a factor and short programs can incur the highest preference value of 1.

However, while the definition of Watched is clear the definition of 'Available' needs clarity as some programs have Scheduled Availability (from EPG), and some programs have Permanent Availability by virtue of being in non-time varying storage i.e. recorded programs (virtual), or are pseudo-permanent by Scheduled Repetition. 'Available' is thus a key definition an over-simple form of which produces an apparent false (low) reading of preference by accumulating too much available time for the highly-available programs i.e. recorded and repeated scheduled programs.

AvailableTime is modified to One-Available-Program-Duration-per-session (OAPDPS). This is justified on the basis that repeat viewing of the material cannot be expected in one session.

This modification then caps the maximum available time added (accumulated) in one session to one full program duration time regardless of the actual availability. For permanent i.e. stored programs, only one program duration per session is added to AvailableTime.

For time added to categories, e.g. genre, rather than a specific program, where there are multiple contributing programs of differing durations, then the cap value 'one program duration' is unclear. In this case, the cap value used is the average of the durations of the contributing programs.

This capping permits the WatchedTime to be higher than AvailableTime and preference ratio to be above value '1' for the case that programs are watched repeatedly in one session. Preference ratio values higher than '1' denote a higher level of preference. Typically the preference ratio will decline over time as repeat viewing cannot be expected even over many sessions.

Examples in the drawing FIGS. 4-17 show that sensible preference ratios and sensible relative program preference order are produced by the above procedure or formula.

An alternative definition of Available-Time is where it is modified to One-Available-Program-Duration-for many sessions (OAPD). This is justified on the basis that repeat viewing of the material is not expected at all.

This allows the original ratio values to remain, and to not decline with every session without repeat. Values of preference ratio are:
Ratio=1, category watched once,
Ratio<1, watched partially and
Ratio>1, watched repeatedly.

Where the available time is capped at one program for one session (as in FIG. 4), then a program that is watched in full once in two sessions has a ratio of one-half, over two sessions. For this alternative version, where the cap is one program for many sessions, the Ratio value of one is retained regardless of the number of sessions and without additional watching. With additional watching the value rises above 1.

Typically this approach will produce preference ratios higher than 1 for many categories and programs and higher ratios overall than other methods.

A special GUI control page is provided to allow the user to select either of the above versions (AvailableTime cap for repeat programs, control GUI):
OAPDPS—one program duration added per session (every session)
OAPD—one program duration added.
For the first session of category availability, i.e. where category or program was first viewed, the Cap is in place regardless of the selection. For the second and subsequent days the cap selection makes a difference to the result.

Paid-for programming is boosted in terms of WatchedTime, i.e., PPV programming is dealt with as other repeatedly available programs but where the whole program was watched it is given enhanced. In that case the WatchedTime category row is made to stand out as being 'more' preferred because it was paid-for, rather than being free.

A special GUI control page is provided to allow a user to select the preference boost of PPV programs or the WatchedTime enhancement level. User selection is from: 0×, 0.5×, 1×, 1.5×, 2×, 2.5× or 3× of program duration minutes added to WatchedTime, once only, after the entire program is viewed (where ×=times, multiple).

The STB system cannot go on accumulating CDB database category and program rows indefinitely, as there are always memory resource limitations and in any case, the database would become unnecessarily large and therefore slow to access. The novel system thus provides for CDB planned obsolescence and database row deletion management.

Rows can be selected for deletion if the preference ratio falls below a certain threshold close to zero. Assuming the row or category is not watched the preference falls at a rate is dependant on AvailableTime accumulation.

Planned obsolescence by forced decay of the preference ratio is introduced by adding AvailableTime periodically -even if there is no actual program (or content) availability. This is deemed necessary to avoid CDB row entries from becoming stale and the overall database from becoming over-large. Decay is increased by adding a block of time to the available time, obtained from the table as follows:
Decay Time block value=(Accumulated-AvailableTime) divided by (Count-ie-CNVR.)

Deletion of a CDB database row category is activated when the preference ratio falls below the specified threshold, such as 0.1, for example.

A special GUI control page may be provided to allow user selection of the persistence or obsolescence rate of the CDB data rows. This ensures that program rows that the user does not wish to delete, yet their row preference ratio has declined for whatever reason, are not unnecessarily deleted. CDB data are collected in the database individually for each user (in practice might be group of people) and control via the GUI is to suit each user individually and offers choices such as a setting of:
fast obsolescence i.e. preference ratio decay or row deletion threshold at a higher preference ratio level or
high persistence (little forced preference ratio decay) or deletion at a low threshold level.

User selection of decay is from: 0, 1 or 2 blocks of decay minutes added per 1, 2 to 'n' sessions or per day or week (see previous section). It is assumed that there is a session count value, day and date is available for this. Alternatively, the GUI shows present setting using a simple wedge shaped diagram or graph and allow the user to select increased or decreased persistence (of preference ratio level) and need not show the detailed values.

Another special control GUI page is provided to allow user selection of the preference ratio threshold level for category preference CDB database row deletion. User selection is of preference ratio minimum level (threshold) i.e. WatchedTime/AvailableTime=0, 0.01, 0.02 to 0.1 and 0.11, 0.12 to 0.2.

Reference will now be had to FIGS. 4-17, which illustrate various examples of preference determination implementations. All examples pertain to 30 minute programs. The watched programs appear with light shading and the available programs appear in the non-shaded boxes. Partially watched programs appear in 10 or 20 minute slots.

The first example in FIGS. 4 and 5 illustrates watched/available time, first day, no caps. The second example in FIGS. 6 and 7 shows watched/available time, first day, with caps. That is, the algorithm pertains to repeated live and recorded programs with the available time capped at program length. The preference ratio is not capped.

FIGS. 8 and 9 illustrated a second day algorithm where one accumulation only is allowed for a program, regardless of the number of repeats. That is, this shows the OAPD version with one-available-program-duration-even-over-many-sessions.

FIGS. 10 and 11 provide examples with 30 and 60 minute programs, pertaining to a first day recording with no caps.

FIGS. 12 and 13 again pertain to program lengths of 30 minutes and some of 60 minutes. The applicable algorithm is for repeated live and recorded programs, available-time is capped at program length. For DCs, available-time is capped at average program length. No ratio cap is applied. DC stands for "don't care" and refers to a category derived from two or more programs or titles and therefore does not have a title (title is DC). As programs producing DC may have different lengths then an average must be used (for cap value). The shaded areas show watched programs. Partially watched programs are in 10 or 20 minutes lots. Here, we apply one-available-program-duration-per-session (OAPD).

FIGS. 14 and 15 also pertain to program lengths of 30 minutes and some of 60 minutes. The algorithm is for repeated live and recorded programs. The available-time is capped at one program length per session (One-Available-Program-Duration-per-session OAPDPS). Ratio is not capped.

FIGS. 16 and 17 also pertain to program lengths of 30 minutes and some of 60 minutes. The algorithm is for repeated live and recorded programs. Available-time is capped at program length. One accumulation only for program, regardless of number repeats (i.e., One-Available-Program-Duration OAPD). For DCs: Available-time is capped at average program length, once only for program regardless of repeats. The preference ratio is not capped.

FIG. 18 provides a comparison of the ratios from the tables in FIGS. 15 and 17. A ratio value of 1 indicates the entire program or category was watched once. Values equal-to-1 indicate watching corresponding to the cap normalized number of programs per the total accounting period e.g. 2 (left), and 1 (right). Values less/more-than-1 indicate watching of the program or category in part, or less/more than the cap normalized number of programs.

For the left-hand portion of the table, the preference ratio shows decay below the nominal 1 value where the category was not watched sufficiently overall in the period e.g. 4, 5, 6, 7, 9.

For the right-hand portion the ratio shows a predominance of super-1 values because the normal number of viewings per the total period, set with the available time accumulation cap, is only one and therefore no decay is exhibited.

The relative ratings are very important, i.e. the rank order of the programs/categories based on preference. One would expect the DC (Don't Care) types as they are derived from multiple programs to generally have higher ratings and the right-hand portion (OAPD) looks slightly more realistic with left-hand portion (OAPDPS) rank 5 in the 4th ranking on the right (OAPD). Also, rank 3 on the left, is 7th on the right (with OAPD) a better rank considering it was only one program watched once and now (at 7th) ranked below others which were watched more than once. However, the type of cap is selectable, for example by the user. The most preferable content preference ranking is selectable.

We claim:

1. A method of personalizing television program availability, comprising:
    observing user activity and program usage behavior of a television program user over a period of time;
    cross-referencing individual programs of a list of available programs against a viewing behavior of the television program user where different pluralities of programs from said list of available programs are associated with different category types;
    generating, from the user activity and the program usage behavior, preference profile information, and storing the preference profile information in a relational database; and
    applying the preference profile information to managing television programs for the user, wherein preference profile information includes assigned program preference ratings, said assigned program preference ratings being determined by a ratio of a total time period of watched programs in a category over an expected available maximum expected time period of programs in the category.

2. The method according to claim 1, wherein the observing, cross referencing and generating steps are performed with distributed software agents.

3. The method according to claim 2, wherein the distributed software agents operate autonomously with built-in algorithms operating on user activity and other events to produce the preference profile information in a special purpose relational database.

4. The method according to claim 3, wherein the distributed software agents are programmed to operate on data items selected from the group consisting of data representing user control events, external EPG information, click-stream data, viewing records, channel lineup lists, and a string table representing internal program lineup availability.

5. The method according to claim 1, further comprising defining a program history relational database for preference determination with index numbers representing external program information text strings.

6. The method according to claim 1, further comprising defining maintenance operations for the relational database including creating, changing, generalizing, enhancing, and expanding program information category data rows in the database.

7. The method according to claim 1, further comprising continually updating the relational database by accumulating time information, program information, and category data row items when a program is watched.

8. The method according to claim 1, further comprising continually updating the relational database with data-dependent input accumulating available time for viewing per each data program information category data row.

9. The method according to claim 1, further comprising maintaining in the relational database a number of forms of pre-processed information representing continually updated user preference information.

10. The method according to claim 9, wherein the pre-processed information includes accumulations of time for watched programs, and split category rows.

11. The method according to claim 1, further comprising capping an available time period of a given program or category for repeated live programs and stored programs.

12. The method according to claim 11, further comprising capping a value for the available time period at one program time period or one program time period per session.

13. The method according to claim 12, further comprising determining separate users based on a probability of being a given user.

14. The method according to claim 1, further comprising accumulating available time in a time period only after the program or category is first watched.

15. The method according to claim 1, further comprising accumulating a watched time period only after the program or category is watched for a given minimum time.

16. The method according to claim 1, further comprising defining a multi-user system and accumulating watched time periods and available time periods separately for each user.

17. The method according to claim 1, further comprising managing the relational database by forcing obsolescence of given data rows by adding available time periodically to force a decay of an assigned preference rating even if there is no actual program available.

18. The method according to claim 1, further comprising deleting a given data row if an assigned preference rating of the row falls below a predetermined deletion threshold.

19. The method according to claim 1, further comprising enabling user input via a user interface (GUI) to control management setting of the relational database.

20. The method of claim 1, wherein the television programs are automatically selected for the user.

21. The method of claim 1, wherein said category types are genres.

22. A method of determining a television user's program preferences, comprising:
   observing via a program determination engine user activity and program usage behavior of a television user over a period of time;
   said program determination engine determining for each of a plurality of programs a time period for available time and each of said plurality of programs is associated with different category types;
   said program determination engine defining a preference profile information of the television user with an assigned program preference rating being determined by a ratio of total time period of watched programs in a category over an expected available maximum expected time period of programs in the category; and
   applying the preference profile information to managing television programs for the user.

23. The method according to claim 22, further comprising observing user activity with regard to stored and recorded programs and defining user preference profile based on the stored and recorded programs.

24. The method according to claim 22, further comprising defining a time period of available time with a cap of only one program time period per accounting period or with a cap of one program time period per viewing session.

25. The method according to claim 22, further comprising defining a time period of available time with a cap of only one program time period per accounting period and a cap of one program time period per viewing session, and enabling the television user to select from the two caps for generating the preference rating.

26. The method according to claim 22, further comprising storing the preference profile information in a relational database.

27. The method of claim 1, wherein an available and expected to be viewed program has a history of being viewed or is a recorded program available for selection that has been partially watched.

* * * * *